(12) United States Patent
Walter et al.

(10) Patent No.: US 11,361,800 B2
(45) Date of Patent: Jun. 14, 2022

(54) METHOD FOR CHARACTERIZATION OF STANDARD CELLS WITH ADAPTIVE BODY BIASING

(71) Applicant: RACYICS GMBH, Dresden (DE)

(72) Inventors: Dennis Walter, Dresden (DE); Sebastian Höppner, Dresden (DE); Holger Eisenreich, Chemnitz (DE)

(73) Assignee: RACYICS GMBH, Dresden (DE)

( * ) Notice: Subject to any disclaimer, the term of this patent is extended or adjusted under 35 U.S.C. 154(b) by 179 days.

(21) Appl. No.: 16/633,328

(22) PCT Filed: Jan. 16, 2018

(86) PCT No.: PCT/EP2018/050947
§ 371 (c)(1),
(2) Date: Jan. 23, 2020

(87) PCT Pub. No.: WO2019/025030
PCT Pub. Date: Feb. 7, 2019

(65) Prior Publication Data
US 2020/0159975 A1    May 21, 2020

(30) Foreign Application Priority Data

Aug. 4, 2017 (DE) .......................... 102017117745.0
Aug. 4, 2017 (DE) .......................... 102017117772.8
(Continued)

(51) Int. Cl.
*G11C 5/14* (2006.01)
*G05F 3/20* (2006.01)
(Continued)

(52) U.S. Cl.
CPC .......... *G11C 5/146* (2013.01); *G01R 31/2856* (2013.01); *G01R 31/31712* (2013.01);
(Continued)

(58) Field of Classification Search
CPC ..... G11C 5/146; G06F 30/20; G06F 2119/08; G06F 2119/06
See application file for complete search history.

(56) References Cited

U.S. PATENT DOCUMENTS 5,692,160 A    11/1997 Sarin
8,970,289 B1 *  3/2015 Lee ..................... H01L 29/7851
                                                327/534
(Continued)

OTHER PUBLICATIONS

Kumar SV, Kim CH, Sapatnekar SS. Mathematically assisted adaptive body bias (ABB) for temperature compensation in gigascale LSI systems. InProceedings of the 2006 Asia and South Pacific Design Automation Conference Jan. 24, 2006 (pp. 559-564). (Year: 2006).*

(Continued)

*Primary Examiner* — Chuen-Meei Gan
(74) *Attorney, Agent, or Firm* — Heslin Rothenberg Farley and Mesiti PC; Nicholas Mesiti

(57) ABSTRACT

A method for an improved characterization of standard cells in a circuit design process is disclosed. Adaptive body biasing is considered during the design process by using simulation results of a cell set, a data-set for performance of the cell set, and a data-set for a hardware performance for a slow, typical and fast circuit property. Static deviations in a supply voltage are considered by determining a reference performance of a cell and a reference hardware performance monitor value at a PVT corner. A virtual regulation and adapting of body bias voltages of the cell set is performed such that the reference performance of the cell or the reference hardware performance monitor value will be reached at each PVT corner and for compensating the static deviation in the supply voltage. The results are provided in a library file.

15 Claims, 2 Drawing Sheets

(30) Foreign Application Priority Data

Figure 1:
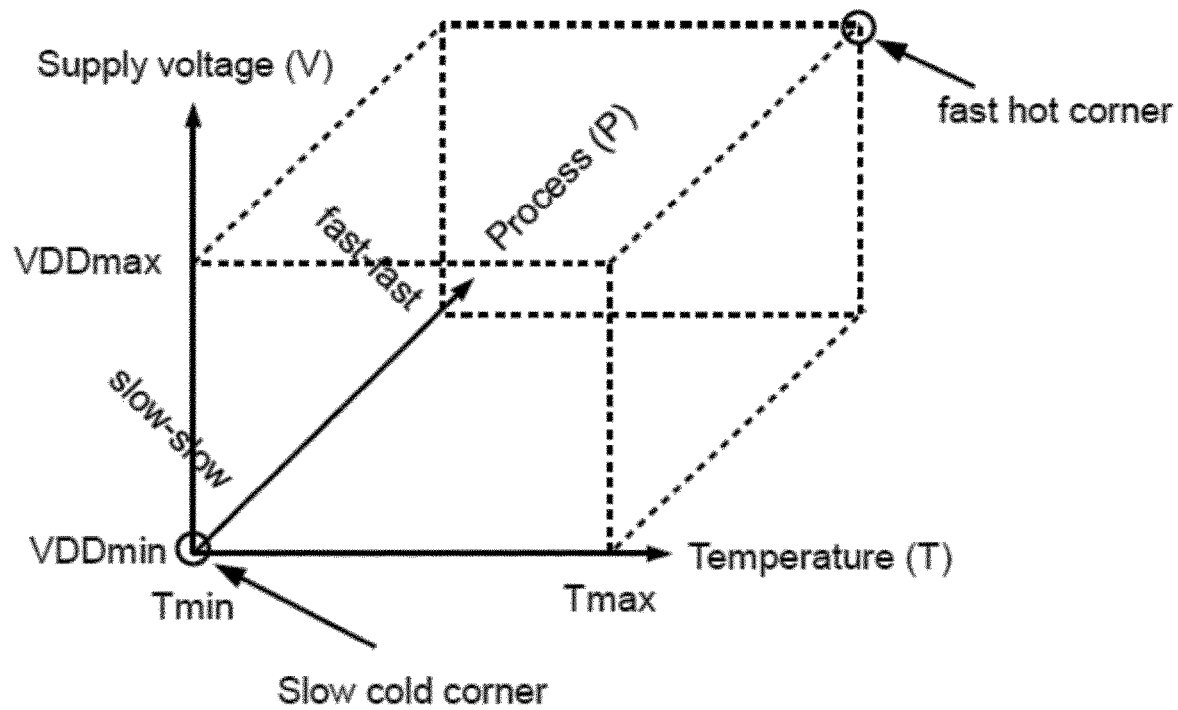

Aug. 22, 2017 (DE) .......................... 102017119111.9
Oct. 27, 2017 (DE) .......................... 102017125203.7

(51) Int. Cl.

| | |
|---|---|
| G01R 31/317 | (2006.01) |
| G06F 11/30 | (2006.01) |
| G06F 11/34 | (2006.01) |
| G06F 30/20 | (2020.01) |
| G06F 30/3312 | (2020.01) |
| G06F 30/398 | (2020.01) |
| G06F 30/39 | (2020.01) |
| G06F 30/337 | (2020.01) |
| G06F 30/30 | (2020.01) |
| G01R 31/28 | (2006.01) |
| H03K 3/03 | (2006.01) |
| G05F 1/00 | (2006.01) |
| G06F 119/08 | (2020.01) |
| G06F 119/06 | (2020.01) |
| G06F 119/12 | (2020.01) |
| G06F 30/3308 | (2020.01) |

(52) U.S. Cl.

CPC .. G01R 31/31718 (2013.01); G01R 31/31725 (2013.01); G05F 1/00 (2013.01); G05F 3/205 (2013.01); G06F 11/3013 (2013.01); G06F 11/3423 (2013.01); G06F 30/20 (2020.01); G06F 30/30 (2020.01); G06F 30/337 (2020.01); G06F 30/3312 (2020.01); G06F 30/39 (2020.01); G06F 30/398 (2020.01); H03K 3/0315 (2013.01); G06F 30/3308 (2020.01); G06F 2119/06 (2020.01); G06F 2119/08 (2020.01); G06F 2119/12 (2020.01)

(56) References Cited

U.S. PATENT DOCUMENTS

| | | | |
|---|---|---|---|
| 2010/0083193 | A1 | 4/2010 | Mbouombouo et al. |
| 2010/0333057 | A1* | 12/2010 | Tang .................. G11C 11/4074 716/126 |

OTHER PUBLICATIONS

Ghosh A, Rao RM, Brown RB. A centralized supply voltage and local body bias-based compensation approach to mitigate within-die process variation. InProceedings of the 2009 ACM/IEEE international symposium on Low power electronics and design Aug. 19, 2009 (pp. 45-50). (Year: 2009).*

Höppner S, Eisenreich H, Walter D, Adaptive body bias aware implementation for ultra-low-voltage designs in 22FDX technology. IEEE Transactions on Circuits and Systems II: Express Briefs. Dec. 13, 2019;67(10):2159-63 (Year: 2019).*

International Preliminary Report on Patentability and Written Opinion issued in PCT/EP2018/050947 dated Feb. 13, 2020.

International Search Report and Written Opinion issued in PCT/EP2018/050947 dated May 8, 2018.

Sanjay V. Kumar et al., "Mathematically Assisted Adaptive Body Bias (ABB) for Temperature Compensation in Gigascale LSI Systems" Design Automation, Asia and South Pacific Conference Jan. 24, 2006, IEEE, pp. 559-564.

Ning Jin, "Characterization and Variation Modeling for 22FDX(TM)" Dec. 31, 2016, Retrieved from the Internet: URL:https://www.globalfoundries.com/sites/default/files/articles/characterization-and-variation-modeling-for-22fdx.pdf, pp. 7, 11, 13, 14, 18-19.

Y. Yuan et al. "Standard cell library characterization for FinFET transistors using BSIM-CMG models" IEEE International Conference on Electro/Information Technology, May 2015, pp. 494-498.

R. Carter, "22nm FDSOI technology for emerging mobile, Internet-of-Things, and RF applications", 2016 IEEE International Electron Devices Meeting (IEDM), San Francisco, CA, Dec. 2016, pp. 2.2.1-2.2.4.

\* cited by examiner

METHOD FOR CHARACTERIZATION OF STANDARD CELLS WITH ADAPTIVE BODY BIASING

CROSS REFERENCE TO RELATED APPLICATIONS

This application is the National Phase filing under 35 U.S.C. § 371 of International Application No. PCT/EP2018/050947, filed on Jan. 16, 2018, and published on Feb. 7, 2019 as WO 2019/025030 A1, which claims priority to German Application No. 102017117772.8, filed on Aug. 4, 2017, and German Application No. 102017117745.0, filed on Aug. 4, 2017, and German Application No. 102017119111.9, filed on Aug. 22, 2017, and German Application No. 102017125203.7, filed Oct. 27, 2017. The contents of each of the prior applications are hereby incorporated by reference herein in their entirety.

The invention relates to a method for an improved characterization of standard cells in a circuit design process.

BACKGROUND

The characterization of digital standard cells comprises the simulative determination of timing and power dissipation of said cells, fabricated in Silicon-on-Insulator (SOI) CMOS technologies with adaptive body biasing control for the use in EDA software tools for automated synthesis and place & route as well as sign-off verification. A standard cell library characterization for Fin FET transistors can be found in Y. Yuan, C. G. Martin and E. Oruklu, "Standard cell library characterization for FinFET transistors using BSIM-CMG models," 2015 IEEE International Conference on Electro/Information Technology (EIT), Dekalb, I L, 2015, pp. 494-498. doi: 10.1109/EIT.2015.7293388.

An overview of the Silicon-on-Insulator (SOI) CMOS technologies is exemplary published in R. Carter et al., "22 nm FDSOI technology for emerging mobile, Internet-of-Things, and RF applications," 2016 IEEE International Electron Devices Meeting (IEDM), San Francisco, Calif., 2016, pp. 2.2.1-2.2.4. doi: 10.1109/IEDM.2016.7838029.

When operating a circuit which comprises standard cells, especially the power dissipation of such cells should be reduced. There are several possibilities for reducing the power dissipation, e.g. by reducing the supply voltage $V_{DD}$. But this leads to some problems. For example, multiple instances of a standard cell show variations of their delay times. It is not possible to predict the precise delay of a particular cell in the design process. Therefore, in the design process, there are built-in pessimism values that guarantee that certain timing criteria will be met in the later circuit. But these pessimisms values must be very large in order to capture also the worst cases. For example, a circuit with a clock speed of 500 MHz should reach this specification also in the worst case of fabrication process or other boundary conditions, like temperature or supply voltage.

One possibility to reduce the power dissipation is the use of a back biasing voltage. In the fully depleted SOI (FD-SOI) technology there is a very thin isolating layer between the transistor and the bulk substrate. Since there is no leakage from source and drain of a transistor to the bulk substrate, less power is lost. In addition, a kind of implant well, which can be biased by a voltage is placed under the thin isolating layer, which helps to more precisely adjust the electrical behavior of the transistor. As example, in a forward body bias, or back biasing scheme, a p-well is underneath the pmos transistor, and a n-well is underneath the nmos transistor. The biased implant well can be seen as a fourth connection of the transistor (back-gate voltage).

The silicon-on-insulator (SOI) CMOS technologies allow the adaptation of the threshold voltage of transistors by adjusting the body bias (back-gate) voltage. The adaptation of the body bias voltage can be done during operation of the circuit, ergo the cells, in order to compensate variations in the fabrication process (P), of the supply voltage (V) and of the temperature (T) in order to achieve a defined delay time and/or leakage current consumption. The adaptation of the body bias threshold voltage is also necessary to adjust an adaptive compromise between switching speed and leakage current consumption in order to be able to adapt the circuit or system with regard to the performance requirement.

In the prior art, which is hitherto known, the characterization of standard cells was carried out without the consideration of body biasing, e.g. by connection of the body bias voltages to the VDD or VSS supply nets. Or the characterization was carried out with fixed body bias voltages at each library corner, whereas an adaption of the body bias voltages during operation could not be considered. Therefore, it was necessary to assume a high pessimism for the determination of the library corners which are used in the simulation process of standard cells by the customers. A pessimism can be seen as an additional design safety value, which leads to an over-constraining of the design during implementation time. This might result in performance loss, higher area consumption or higher power consumption.

A library corner can be seen as a summary of design or fabrication conditions and parameters which influence the speed of the circuit and which are needed to simulate how a designed circuit may work later. The library corners are also called PVT corners comprising conditions considering the process (P), the supply voltage (VDD) and the temperature (T). The process (P) is characterized by the used device model and the RC extraction model of a foundry where the circuit will be fabricated. A device model is specific for a foundry, and is adapted to the specific fabrication processes in said foundry. A RC extraction model considers the parasitic and coupling capacitances of the transistor wirings which have an influence on the delay time and power consumption of the circuit. Summarizing, a PVT corner reflects a minimum or typical or maximum condition with respect to a circuit characteristic, e.g. delay time (slow/typical/fast) or leakage current consumption.

For example, a worst case timing PVT corner means that the process (P) produces a circuit with a high delay time, the operating temperature (T) is low (in case temperature inversion applies) and the supply voltage (V) is low. In order to tune this circuit in the range of a typical timing performance of such a circuit the body bias voltages had to be increased during operation, in case a forward body bias scheme (FBB) is applied. In another example, a best case timing PVT corner means that the process (P) produces a circuit with a low delay time, the operating temperature (T) is high and the supply voltage (V) is high. In case of a forward body biasing scheme, the back gate voltages can be reduced (up to zero) while maintaining a circuit delay better than the typical performance of such circuit, but with reduced leakage currents compared to the nominal body bias voltage settings. In order to capture all these possible extreme conditions the pessimisms for the PVT corners have to be very high and must be incorporated in the design process.

The timing and power consumption of digital circuit components (e.g. standard cells) are modelled in library files (.lib files). These models are provided together with the IP to allow integration of these cells in automated tool flows for synthesis, place & route, timing analysis and power analysis.

As mentioned above high pessimisms of the PVT corner values are necessary to guarantee that also in a worst case scenario the circuit will achieve the defined target performance. An adaption of the body bias voltages during circuit operation is so far not considered in the timing and power models.

It is therefore the objective of the invention to provide a method for compiling library files, which are used for the design process of cells in digital circuits, whereas the adaptive body biasing (ABB) can be considered during the design process if the operation of said cells in said circuits will use the ABB.

Furthermore, static and dynamic variations in the supply voltage of said circuit should be considerable as well as inaccuracies in the adaption of the body bias voltages of the transistors of the cells. Inaccuracies are caused e.g. due to static and dynamic ripple failures in the generation of the body bias voltages, e.g. through a charge pump.

SUMMARY OF THE INVENTION

The object of the invention will be solved by a method for characterization of a standard cell with adaptive body biasing, whereas the cell is defined by a fabrication process P, a supply voltage VDDnom and an operating temperature T, whereas the method comprises the following steps:
- simulating a cell set over P, V and T, and generating a data-set for a performance F of the cell set with F(VDD, T, VNW, VPW, Process(ss,tt,ff,sf,fs)) for a s-slow, t-typical and f-fast circuit property,
- simulating a performance monitor circuit over P, V and T, and generating a data-set for a hardware performance monitor value C with C(VDD, T VNW, VPW, Process (ss,tt,ff,sf,fs)) for a s-slow, t-typical and f-fast circuit property,
- considering static deviations in the supply voltage $VDD_{nom}$ of the cell by a first pessimism+/−x %, resulting in $VDD_{c,PVT}=VDD_{nom}+/-x$ %, and obtaining thereof a set of PVT corners with (Process, $VDD_{c,PVT}$, $T_c$) for said PVT corners,
- determining a reference performance F0 of a cell at a particular PVT corner,
- determining a reference hardware performance monitor value C0 at the particular PVT corner,
- performing a virtual regulation and adapting of body bias voltages to $VNW_{c0}$ and $VPW_{c0}$ of the cell set such that said reference performance F0 of the cell or said reference hardware performance monitor value C0 will be reached at each PVT corner of said set of PVT corners and for compensating the static deviation in the supply voltage, and hence
- defining a set of PVTBB corners for each said PVT corner with (Process, $VDD_{c0,PVTBB}$, ($VPW_{c0}$, $VNW_{c0})T_{c0}$), and
- providing the results of characterizing the cell with adaptive body biasing in a library file.

A standard cell in the sense of this invention is a logic cell comprising nmos and pmos transistors. Examples for standard cells are logic gates, flip-flops, clock buffer cells, inverter cells, clock inverter cells and so on.

In a first step of the method process, performances, like timing and leakage of a cell and the relationship between timing arcs, e.g. rising and falling edge will be defined. I.e. for clock buffer cells it is important that nmos and pmos transistors have the same switching time, meaning that the delay time of the rising and falling edge should be equal, because otherwise the pulse width of the clock signal will be distorted.

Furthermore, a simulation of target performances of a selected cell set, e.g. inverter or clock inverter cells, for a specified range of process variations, supply voltages VDD, temperatures T will be performed, whereas the same simulation models are used as for the timing and power characterization process within the following steps. The simulations perform the specified range of process variations (e.g. considering slow-nmos/slow-pmos, fast-nmos/fast-pmos device conditions), the supply voltage range to be considered and the temperature range. It is proposed to perform a sweep over the available range of n-well and p-well body bias voltages. The simulation of the cell set defined by P, V and T results in the generation of a data-set for a performance F of the cell set, summarized with F(VDD, T, VNW, VPW, Process(ss,tt,ff,sf,fs)). VDD is the supply voltage, T is the temperature, VNW and VPW are the body bias voltages of the cell and the process is characterized for different conditions (slow-nmos/slow-pmos, typical-nmos/typical-pmos, fast-nmos/fast-pmos, slow-nmos/fast-pmos, fast-nmos/slow-pmos).

In a next step of the inventive method PVT corners for a slow, typical and fast condition will be determined and obtained by considering static deviations in the supply voltage $VDD_{nom}$ of the cell by a first pessimism+/−x %, resulting in $VDDc,PVT=VDD_{nom}+/-x$ %. During operation of the circuit, the supply voltage may deviate from the nominal value $VDD_{nom}$. On the one hand, there are static or slowly varying deviations which can be compensated in the case of an adaptive control of the body bias voltage and on the other hand there are dynamic, rapid power supply voltage changes which cannot be compensated in the case of adaptive control of the body bias voltage. In this stage only the static deviations are considered, since they can be compensated by the adaptive body biasing scheme. As example, when considering a nominal supply voltage of 0.40V, a worst case assumption of static supply voltage variation of −5% would result in VDD=0.38V as value for VDDc,PVT in the worst case PVT corner.

Each PVT corner of a set of PVT corners is characterized by the triple (Process, VDDc,PVT, Tc). For example, a typical condition is characterized by a typical process, with typical speed of nmos and pmos transistors, a supply voltage of 0.40 V and a temperature of 25° C.; a slow/cold condition is characterized by a worst process, a supply voltage of 0.38 V and a temperature of −40° C.

In a further step of the invention a reference performance F0 of a cell set at a particular PVT corner, a reference hardware performance monitor value C0 at the particular PVT corner and nominal body bias voltages VNW and VPW will be determined by using the simulation results of the first step of the inventive method. Afterwards a virtual regulation and adaptation of body bias voltages VNW and VPW of the cell set are performed in such a way that said reference performance of the cell set will be reached at each PVT corner of said set of PVT corners and for compensating the static deviation in the supply voltage, within the available value ranges of the bias voltages. The virtual regulation will be done by numerical processes, like target value search, optimization and interpolation. The results are pairs of (VNWc0, VPWc0) for each PVT corner. Hence, for each PVT corner a single set of PVTBB corners is indicated which is characterized by the parameter set (Process, VDDc0,PVTBB, (VPWc0, VNWc0) Tc0). In other words, not only the voltage V and the temperature T belong to a corner, but in the simulation model, with which the customer can simulate his circuit, there is also an indication of the body bias voltages VNW and VPW.

It is very advantageous if the specific body bias voltages VNWc0 and VPWc0 for a corner are determined before the characterization of the cells, because for each PVT corner a pair of individual p-well and n-well voltages can be assumed. The determination of these body bias voltages is performed by a virtual feedback control, a numerical method, assuming that the standard cells operate in a system or circuit with adaptive body bias control.

It is also very advantageous that static variations of the supply voltage can be compensated with the virtual regulation of the body bias voltages.

Last but not least the results are provided in an optimized library file for characterizing the cell with adaptive body biasing.

The method for generating a design model for the PVTBB corners with the assumption that a virtual regulation of the body bias voltages has already been performed, has the positive effect that the customer gets a design model which has not the worst-case dimension, but rather a design model with a smaller dimension due to the gain of the adaptive body bias regulation, hence a dimension which the customer really deals with when characterizing the operation of the circuit.

In different preferred embodiments of the inventive method, the determination of the reference performance F0 of a cell set at a particular PVT corner, the reference hardware performance monitor value C0 at the PVT corner and nominal body bias voltages VNW and VPW can be performed differently.

In one approach the reference hardware performance monitor value C0 is determined by considering a worst case P, V, T condition and choosing the bias conditions for maximum performance in this condition. From the simulation data of the selected cell set, the reference performance F0 at this condition is determined. From the simulation database of the performance monitor circuit its reference output C0 is determined.

In an alternative approach the reference hardware performance monitor value C0 is determined by considering a typical P, V, T condition and choosing a centered value of the bias voltages. From the simulation data of the selected cell set, the performance F0 at this condition is determined. From the simulation database of the performance monitor circuit its reference output C0 is determined.

In a further alternative approach the reference hardware performance monitor value C0 is determined by considering a best case P, V, T condition and choosing the bias conditions for minimum leakage current performance in this condition. From the simulation data of the selected cell set, the performance F0 at this condition is determined. From the simulation database of the performance monitor circuit its reference output C0 is determined.

In a very preferred embodiment of the inventive method, the method further comprises considering dynamic derivations in the bias voltage and mismatch of the hardware performance monitor by adding a pessimism $+/-\Delta VPW$ or $+/-\Delta VNW$ to the adapted body bias voltages related to said reference performance F0 of the cell, resulting in (VNWc, VPWc) for each PVT corner and is used for representing a charge pump ripple.

By generating the body bias voltages, inaccuracies may occur, for example due to static and dynamic (ripple) errors, e.g. by a charge pump.

Another source of inaccuracies are mismatch effects of the hardware performance monitor circuits used for adaptive body bias regulation, compared to the model assumption. These inaccuracies can be taken into account by adding a further pessimism $+/-\Delta VPW$ or $+/-\Delta VNW$ to the adapted body bias voltages.

The assumed pessimism contains the components $+/-\Delta VPW_a$ and $+/-\Delta VNW_a$ as pessimisms due to the body bias voltage actuator (e.g. charge pump).

In another embodiment of the inventive method, the pessimism $+/-\Delta VPW_m$ or $+/-\Delta VNW_m$ added to the adapted body bias voltages is used for representing a mismatch in a hardware performance monitor.

Therefore it reads $$\Delta VNW = \Delta VNW_a + \Delta VNW_m$$

$$\Delta VPW = \Delta VPW_a + \Delta VPW_m$$

The pessimisms or safety margins for the body bias voltages $\Delta VNW$ and $\Delta VPW$ are considered in the inventive characterization method by Slow timing: Addition or subtraction of $\Delta V$ such that the resulting pessimism leads to slower timing;

Typical timing: No addition or subtraction of $\Delta V$;

Fast timing: Addition or subtraction of $\Delta V$ such that the resulting pessimism leads to faster timing.

The library characterization of the circuit blocks in the regulated domain is performed with these margins considered.

For example, for forward body biasing (FBB) the pessimism can be as follows for different PVT corners characterized with slow, typical and fast timing of the transistors:

$(VPWc, VNWc) = (VNWc0 - \Delta VNW, VPWc0 + \Delta VPW)$ Slow timing:

$(VPWc, VNWc) = (VNWc0, VPWc0)$ Typical timing:

$(VPWc, VNWc) = (VNWc0 + \Delta VNW, VPWc0 - \Delta VPW)$. Fast timing:

For reverse body biasing (RBB) the pessimism can be as follows for different PVT corners characterized with slow, typical and fast timing of the transistors:

$(VPW_c, VNW_c) = (VNW_{c0} + \Delta VNW, VPW_{c0} - \Delta VPW)$ Slow timing:

$(VPW_c, VNW_c) = (VNW_{c0}, VPW_{c0})$ Typical timing:

$(VPW_c, VNW_c) = (VNW_{c0} - \Delta VNW, VPW_{c0} + \Delta VPW)$. Fast timing:

In the adaptive biasing methods a closed loop regulation of the bias voltages (e.g. VNW and VPW, or VDD) is regulated in a closed loop control, based on a performance sensor, called hardware performance monitor.

The determination of body bias pessimism or also called safety margins for consideration of variability in these voltages can be addressed as follows: If a single bias voltage V1 is considered (e.g. bias VDD in adaptive voltage scaling, single well adaptive body biasing) a linearized sensitivity k1 between the bias voltage V1 and a hardware performance monitor count value c can be determined with $k1 = dc/dV1$, by means of circuit simulations or measurements; then a standard deviation $\sigma c$ of the hardware performance monitor result c from Monte Carlo simulations or statistical measurements is determined. Afterward, a safety margin $\Delta V1$ for p-sigma pessimism (e.g. p=3) by $\Delta V1 = n \cdot \sigma c / k1$ is determined. This safety margin $\Delta V1$ is optionally and additionally considered in the inventive characterization method.

In another case, if two bias voltages [V1, V2] are considered (e.g. adaptive body bias with n-well and p-well voltages), and two hardware performance monitors with results c1 and c2 are used in the regulation loop. For this setup selective, linearized sensitivities are determined, organized as matrix A=[k11,k12; k21,k22] with $k_{11}=d_{c1}/dV_1$ $k_{12}=d_{c1}/dV_2$ $k_{21}=d_{c2}/dV_1$ $k_{22}=d_{c2}/dV_2$.

A standard deviation vector b=[σc1, σc2] of the hardware performance monitor result c1 and c2 from Monte Carlo simulations or statistical measurements is determined. Therewith, a vector of safety margins v=[ΔV1, ΔV2] by v=A−1·b (the inverse of matrix A multiplied with the vector b) is calculated. These safety margins ΔV1 and ΔV2 can be optionally and additionally considered in the inventive characterization method.

In another case, if m (m>2) bias voltages and m PVT hardware performance monitors are used, the previous explained procedure can be applied, but with generalizes an m-by-m matrix A and vectors b and v of length m.

In another preferred embodiment of the inventive method, the method further comprises considering dynamic deviations of the supply voltage VDD by a second pessimism value+/−y %, resulting in VDDc,PVTBB=VDD$_{nom}$+/−(x+y) %. Hence, the second pessimism is necessary for deviations which cannot be adjusted by the adaptive body biasing. For example, a typical PVTBB corner is characterized by a typical process, a supply voltage of 0.4 V, VNW of 0.6V, VPW of −0.8V and a temperature of 25° C.; a slow/cold PVTBB corner is characterized by a worst process, a supply voltage of 0.38V, VNW of 1.2V, VPW of −1.6V and a temperature of −40° C.

It is very preferable that an additional separate consideration of dynamic variations of the supply voltage is performed by a second pessimism. In contrast to state of the art characterization methods of standard cells, an overall assumed variation of the supply voltage is divided into two parts, a static part that can be adjusted by the adaptive body biasing and a dynamic part that has to be considered by an additional pessimism value. But this pessimism value is much smaller than in state of the art characterization method, because the adaptation of the body bias voltages is regulated during the characterization process accordingly.

In an embodiment of the inventive method, a performance F in the PVTBB corners is determined by interpolation based on the generated data-set and different VNW and VPW values, whereas the results are provided in a library file.

This alternative has the advantage/effect that a set of pre-generated simulation data files as a result of a time consuming library characterization, can be used as inputs for the determination of the body-bias specific timing files, based on interpolation, which results in significantly reduced simulation effort for determination of the timing and power characterization based on this inventive method.

In a further embodiment of the inventive method, the adaptive body biasing of a PVT corner is performed before the characterization of a cell. This has the effect that for cells which have to be characterized and which are operated with the adaptive body biasing (ABB), the ABB can be considered in the library files.

In a further embodiment of the inventive method, a circuit property can be a delay time described by the PVTBB corners or in another embodiment the circuit property can be a leakage current consumption described by the PVTBB corners. So, the design model contains PVTBB corners which are characterized by specific properties of the circuit and to which an adaptive body biasing regulation and pessimism are added for characterizing cells that will be fabricated under these conditions specified in the PVTBB corners.

In an embodiment of the inventive method the first pessimism can also be expressed by +/−ΔVDDstat. A static deviation (in the millivolt [mV]-range) can be added to the nominal supply voltage of the circuit.

In an embodiment of the inventive method the second pessimism can also be expressed by +/−ΔVDDdyn. A dynamic deviation can be added to the nominal supply voltage of the circuit additionally to the static deviation. The dynamic deviation cannot be adjusted by the virtual regulation of the adaptive body biasing, because they are too fast and the regulation is too sluggish in order to follow these changes. Therefore, it is necessary to consider such deviations by an additional pessimism.

In a further embodiment, the inventive method is used for the characterization of analogue or mixed-signaled circuit blocks, whereas a circuit block is an oscillator circuit or a driver circuit.

The invention will be explained in more detail using an exemplary embodiment.

BRIEF DESCRIPTION OF THE DRAWING FIGURES

The appended drawings show

Figure 2:
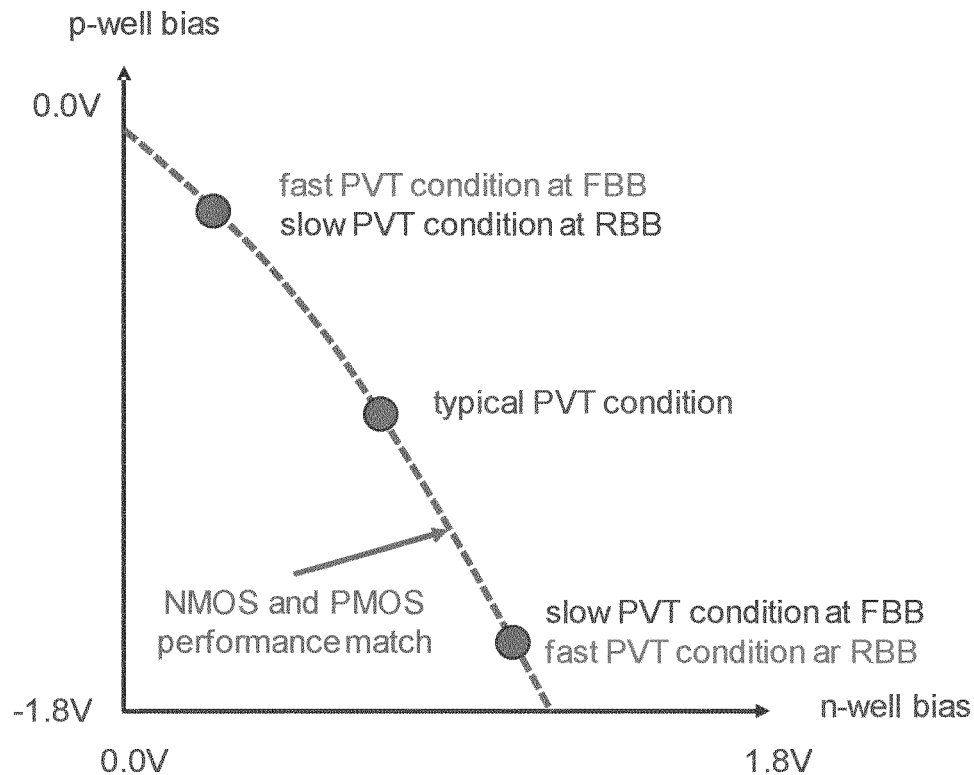
Figure 3:
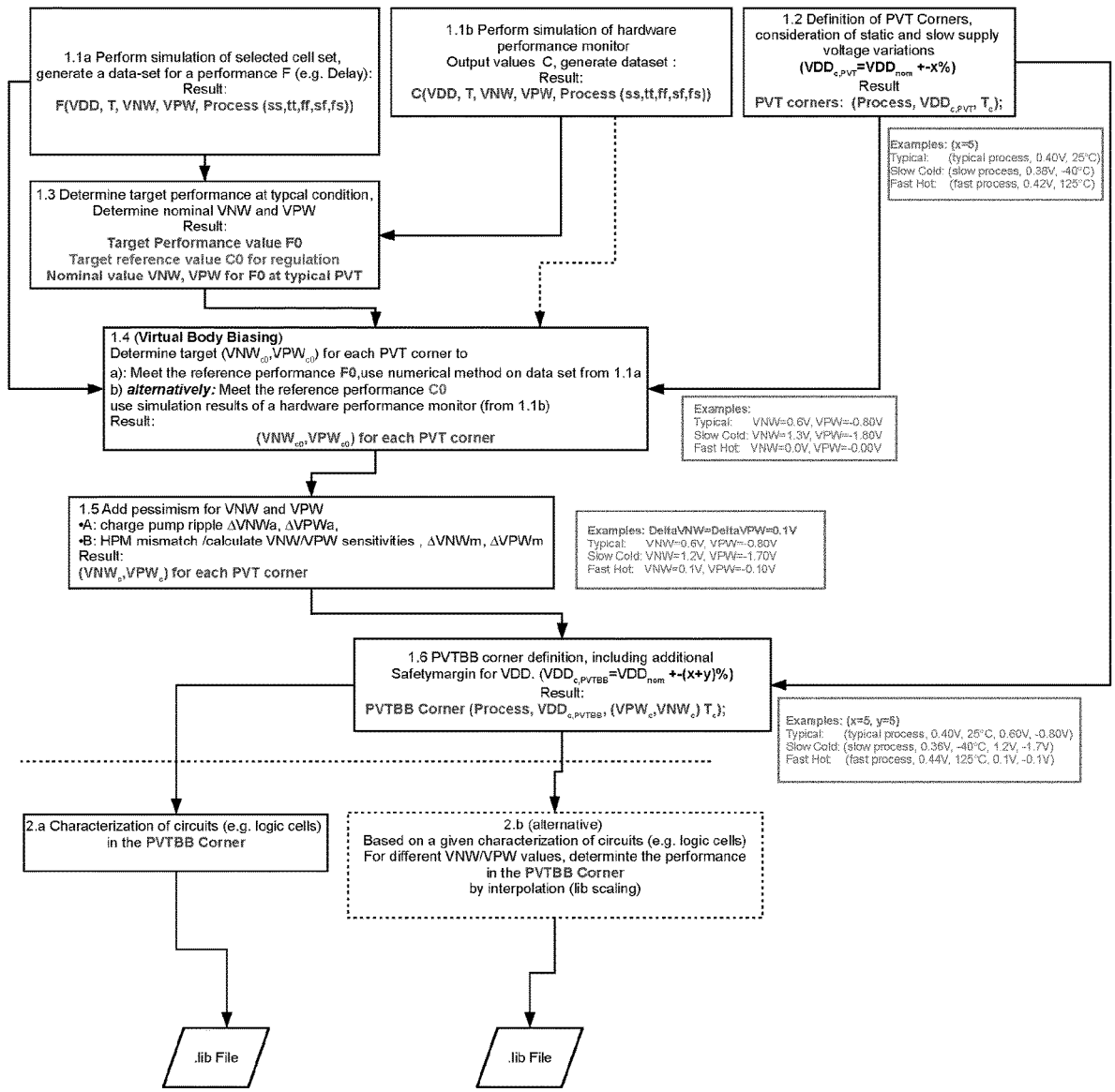

FIG. 1 Visualization of the PVTBB corners according to the invention;

FIG. 2 Illustration of the body biasing, the adaption of the n-well-bias and p-well bias voltages for regulation of the performance of a cell;

FIG. 3 Overview of the overall procedure of the inventive method for characterization of a standard cell with adaptive body biasing.

DETAILED DESCRIPTION

FIG. 1 shows a visualization of the PVTBB corners. These PVTBB corners can be represented as the corners of a cube, whereas the size of the cube is characterized by the three dimensions temperature (T), supply voltage VDD and process (P). The process (P) dimension extends from slow-slow, meaning slow-nmos/slow-pmos referring to timing to fast-fast, meaning fast-nmos/fast-pmos referring to timing, the temperature (T) from Tmin to Tmax, and the supply voltage from VDDmin to VDDmax. A slow/cold corner is characterized by a low temperature, a low supply voltage and a slow process. A fast/hot corner is characterized by a high temperature, a high supply voltage and a fast process.

So far, the characterization of standard cells was carried out without consideration of body biasing, e.g. through the connection of VSS nodes, or the characterization was carried out with fixed body bias voltages at each library corner, whereas an adaption of the body bias voltages during operation could not be considered. Therefore, it was necessary to assume a high pessimism for the determination of the library corners which are used in the simulation/characterization process of standard cells by the customers.

With the inventive method the consideration of the specific body bias values VNWc and VPWc for a corner is possible before the final characterization of the cell is carried out. This will be achieved by performing a "virtual regulation" (numerical method) and assuming that these cells operate in an adaptive body bias control system. The virtual regulation of the body bias voltages takes into account static variations of the supply voltage. Additionally, a separate consideration of dynamic variations of the supply voltage that cannot be compensated by the control loop can be performed during the characterization process of the cells. Adding pessimism for VNW and VPW voltages has the effect that dynamic variation of the VNW and VPW voltages during system operation (e.g. caused by ripple of charge pumps) can be considered as pessimism $\Delta VNWa$ and $\Delta VNWa$ during characterization of the library. Additionally the variability of the performance monitor within the adaptive body biasing regulation hardware can be considered as effective mismatch of the resulting VNW and VPW voltages, described by $\Delta VNWm$ and $\Delta VPWm$. This can be considered in the safety margins $\Delta VNW$ and $\Delta VPW$ by $$\Delta VNW = \Delta VNWa + \Delta VNWm \text{ and } \Delta VPW = \Delta VPWa + \Delta VPWm.$$

In the fixed corners predefined in this way, the adaptation of the circuit properties by the dynamic adaptive control of the body bias voltages during operation is correctly modeled under all conceivable application scenarios. Using the existing worst case sign-off methodology and best-case assumptions, the correct functionality can be ensured during the design process, because the behavior of the adaptive control is fully contained in the corner definitions.

Only absolutely necessary pessimisms in the static corner are considered, all other adaptively controllable properties are compensated by the body bias voltages. This enables the best possible implementation of the circuit.

In case a characterization of the standard cell library is already available, the method of the invention can be applied to generate the target VNW and VPW values (including pessimisms) for the adaptive body bias operation. By means of library interpolation (supported by state-of the art design implementation tools), the library performance at the target corners by the invention can be generated by interpolation.

FIG. 2 illustrates the body biasing and the adaption of the n-well bias and p-well bias for regulation of the performance of a cell. It shows the VNW (x-axis) and VPW (y-axis) plane. For a given performance (e.g. rising edge delay or falling edge delay of a clock inverter cell) its value depends on both VNW and VPW, and the PVT condition. As additional constraint, the match between two performances, e.g. rising edge delay of a clock inverter cell equals falling edge delay of a clock inverter cell can be defined. This results in a relation between VNW and VPW (drawn line) which must be fulfilled. An adaptive body bias regulation scheme (circuit) can meet this constraint adaptively during system operation.

Fulfilling the nominal performance criterion at a typical PVT condition, as example, results in the nominal VNW VPW values.

In case the PVT condition is slow for timing, the VNW/VPW voltages have: absolute higher values in case of forward body biasing (FBB), absolute lower values in case of reverse body biasing (RBB).

In case the PVT condition is fast for timing, the VNW/VPW voltages have: absolute lower values in case of forward body biasing (FBB), absolute higher values in case of reverse body biasing (RBB).

FIG. 3 shows an overview of the overall procedure of the inventive method for characterization of a standard cell with adaptive body biasing.

The method for characterization of a standard cell with adaptive body biasing is carries out in several steps.

In a first step a simulation of a selected cell set is performed, in order to generate a data-set for a performance F. This results in F(VDD, T, VNW, VPW, Process(ss,tt,ff,sf,fs)).

Furthermore, a simulation of a hardware performance monitor output value C is performed, in order to generate a data-set C(VDD, T, VNW, VPW, Process(ss,tt,ff,sf,fs)).

At the beginning of the method it is also possible to define PVT corners and to consider static and slow supply voltage variations by VDDc,PVT=VDD$_{nom}$+/−x %, which results in PVT corners/Process, VDDc,PVT, Tc).

In a second step of the method, the target performance at typical condition is determined by using the simulation results of the first step, and hence the nominal values of VNW and VPW are determined. This results in a target performance F0, a target reference value C0 for the regulation of the nominal values VNW and VPW for F0 at typical PVT conditions.

In a further step, these results and the defined PVT corners are used for the virtual body biasing. With the virtual body biasing the target performance (VNWC0, VPWC0) for each PVT corner is determined to a) meet the reference performance F0 by using a numerical method on dataset from the first step of the method, and b) alternatively meet the reference hardware performance monitor value C0 by using the simulation results of the hardware performance monitor. The result of this step is (VNWC0, VPWC0) for each PVT corner.

In a next step, pessimism for VNW and VPW is added, e.g. a charge pump ripple $\Delta VNWa$, $\Delta VPWa$ is added or a hardware performance monitor mismatch/calculate VNW/VPW sensitivities $\Delta VNWm$, $\Delta VPWm$ is added, whereas this results in (VNWC, VPWC) values for each PVT corner.

Furthermore, a set of PVTBB corners for each said PVT corner with (Process, VDDc0,PVTBB, (VPWc0, VNWc0) Tc0)) and including an additional safety margin for VDD by VDDc,PVTBB=VDD$_{nom}$+/−(x+y) %, whereas this results in PVTBB corner (Process, VDDc,PVTBB, (VPWc, VNWc) Tc)).

The overall results of characterizing the cell with adaptive body biasing are provided in a library file.

In a very preferred embodiment of the inventive method, the pessimism or safety margins of the bias voltages will be illustrated by two examples.

Example 1

Two bias voltages for adaptive body biasing are considered: $\Delta V1 = \Delta VPWm$ (p-well voltage pessimism for hardware performance monitor) $\Delta V2 = \Delta VNWm$ (n-well voltage for hardware performance monitor), with $\Delta V1 > 0$ and $\Delta V2 > 0$ based on the inventive method for characterization of a standard cell, the safety margin is added to the nominal values of VNWc0 and VPWc0, additionally to the $\Delta VNWa$ and $\Delta VPWa$ actuator pessimism, which considers static and dynamic mismatch of the bias voltage actuators (e.g. charge pumps):

Forward Body Biasing (FBB):

$(VPW_c, VNW_c) = (VNW_{c0} - \Delta VNW_a - \Delta VNW_s, VPW_{c0} + \Delta VPW_a + \Delta VPW_m)$     Slow timing:

$(VPW_c, VNW_c) = (VNW_{c0}, VPW_{c0})$     Typical timing:

$(VPW_c, VNW_c) = (VNW_{c0} + \Delta VNW_a + \Delta VNW_m, VPW_{c0} - \Delta VPW_a - \Delta VPW_m)$     Fast timing:

Reverse Body Biasing (RBB):

$(VPW_c, VNW_c) = (VNW_{c0} + \Delta VNW_a + \Delta VNW_m, VPW_{c0} - \Delta VPW_a - \gamma VPW_m)$   Slow timing:

$(VPW_c, VNW_c) = (VNW_{c0}, VPW_{c0})$   Typical timing:

$(VPW_c, VNW_c) = (VNW_{c0} - \Delta VNW_a - \Delta VNW_m, VPW_{c0} + \Delta VPW_a + \Delta VPW_m)$   Fast timing:

Example 2

One regulated supply voltage VDD for adaptive voltage scaling is considered: $\Delta V_1 = \Delta VDD$ (supply voltage), with $\Delta V_1 = \Delta VDD > 0$, the safety margin is added to the nominal values of $VDD_0$ as described:

$(VDD) = (VDD_0 - \Delta VDD)$   Slow timing:

$(VDD) = (VDD_0)$   Typical timing:

$(VDD) = (VDD0 + \Delta VDD)$   Fast timing:

The invention allows to consider the adaptive bias voltages, e.g. VNW and VPW which are present in the operation of the circuit, e.g. when operated in a closed loop biasing scheme with hardware performance monitor, during cell characterization and implementation. Thereby, pessimisms are reduced and better power performance and area results can be obtained.

The invention claimed is:

1. Method for characterization of a standard cell with adaptive body biasing, wherein the standard cell comprises a plurality of nmos transistors, pmos transistors, n-wells and p-wells, wherein the characterization of the standard cell is defined by a specified operating range of a fabrication process delay time dependency P of the standard cell, a specified operating range of a supply voltage V of the standard cell and a specified operating range of an operating temperature T of the standard cell, wherein the fabrication process delay time dependency P is a function of a minimum and a maximum switching time of the nmos and pmos transistors of the standard cell, the method comprising the following steps:

simulating a standard cell data-set over the specified operating ranges of P, V and T, and generating a data-set for an operating range of a performance value F of a circuit characteristic of the standard cell with F being a function of V, T, P, VNW and VPW, wherein VNW is an adaptive body biasing voltage applied to the n-wells and VPW is an adaptive body biasing voltage applied to the p-wells;

simulating a hardware performance monitor circuit data-set over the specified operating ranges of P, V and T, wherein the hardware performance monitoring circuit monitors the performance value F of the standard cell, and generating a data-set for an operating range of a hardware performance monitor value C of a characteristic of the performance monitor circuit, with C being a function of V, T, P, VNW and VPW;

considering static deviations in the supply voltage V of the standard cell by applying a pessimism of plus or minus x percent (i.e., +/−x %) to a nominal voltage value $VDD_{nom}$ of the supply voltage V, resulting in a determination of corner voltage values $VDD_{c,PVT}$ of the supply voltage V, wherein each $VDD_{c,PVT}$ equals $VDD_{nom} +/- x\ \%$, and further obtaining thereof a set of PVT corner values, which define a set of PVT corners, wherein the PVT corner values comprise a minimum and a maximum process delay time dependency value of P, a minimum and a maximum operating temperature value of T and a minimum and a maximum value of $VDD_{c,PVT}$ and the PVT corners are each defined by a PVT corner value of P, V and T;

determining a reference hardware performance value F0 of the set of performance values F of the standard cell, wherein the reference performance value F0 is a function of P, V and T values that are within the PVT corner values of the standard cell;

determining a reference hardware performance monitor value C0 of the set of performance monitor values C, wherein C0 is the value associated with the performance monitoring circuit monitoring the performance value F0 of the standard cell;

performing a virtual regulation and adapting of body bias voltages VNW and VPW to determine a $VNW_{c0}$ of the VNW and a $VPW_{c0}$ of the VPW for each PVT corner of the set of PVT corners of the standard cell such that, when $VNW_{c0}$ and $VPW_{c0}$ are applied to each associated PVT corner of the set of PVT corners, said reference performance value F0 of the standard cell or said reference hardware performance monitor value C0 will be reached at each PVT corner of said set of PVT corners and the static deviation in the supply voltage will be compensated for by the application of the $VNW_{c0}$ and $VPW_{c0}$ at each associated PVT corner;

defining a set of PVTBB corner values, which define a set of PVTBB corners for the set of PVT corners, wherein each PVTBB corner value is a function of P, T, $VDD_{cPVT}$, $VNW_{c0}$ and $VPW_{c0}$, and the PVTBB corners are each defined by a PVTBB corner value of P, V and T, and wherein in a three dimensional graph of P, V and T, the set of PVTBB corners define a first area in the graph that is smaller than, and positioned within, a second area in the graph defined by the set of PVT corners; and providing the results of characterizing the cell with adaptive body biasing in a library file.

2. The method for characterization of a standard cell with adaptive body biasing according to claim 1, wherein the reference hardware performance monitor value C0 is determined by considering a worst case P, V, T condition wherein P, V and T correspond to a PVT corner having a maximum process delay time dependency value of P, the minimum or the maximum operating temperature value of T, and the minimum supply voltage value of $VDD_{cPVT}$ (i.e., $VDD_{nom} - x\ \%$), and choosing bias conditions for maximum performance in the worst case P, V, T condition, or the reference hardware performance monitor value C0 is determined by considering a typical P, V, T condition wherein P has a value that is between the minimum and the maximum process delay time dependency value of P, V has a value that is substantially equal to $VDD_{nom}$ and T has a value that is between the minimum and the maximum operating temperature value of T, and choosing a centered value of the bias voltages, or the reference hardware performance monitor value C0 is determined by considering a best case P, V, T condition wherein P, V and T correspond to a PVT corner having a minimum process delay time dependency value of P, the minimum or the maximum operating temperature value of T, and the maximum supply voltage value of $VDD_{cPVT}$ (i.e., $VDD_{nom} - x\ \%$), and choosing bias conditions for minimum leakage current performance in the best case P, V, T condition.

3. The method for characterization of a standard cell with adaptive body biasing according to claim 2, wherein the method further comprises considering dynamic derivations in the bias voltages VNW and VPW by adding a VPW dynamic derivation pessimism of plus or minus (i.e., +/−) ΔVPW to the VPW or by adding a VNW dynamic derivation pessimism of +/−ΔVNW to the VNW related to said reference performance F0 of the standard cell, wherein VNW+/−ΔVNW equals $VNW_c$ and wherein VPW+/−ΔVPW equals $VPW_c$, for each PVT corner and is used for representing a charge pump ripple.

4. The method for characterization of a standard cell with adaptive body biasing according to claim 3, wherein a pessimism of plus or minus $ΔVPW_m$ (i.e., $+/−ΔVNW_m$) is added to the adaptive body bias voltage VPW or a pessimism of plus or minus $ΔVNW_m$ (i.e., $+/−ΔVNW_m$) is added to the adapted body bias voltage VNW, wherein $ΔVPW_m$ and $ΔVPW_m$ are used for representing a mismatch effect in the hardware performance monitor circuit.

5. The method for characterization of a standard cell with adaptive body biasing according to claim 4, wherein the method further comprises considering dynamic deviations in the supply voltage V of the standard cell by applying a pessimism of plus or minus y percent (i.e., +/−y %) to the nominal voltage value $VDD_{nom}$ of the supply voltage V, resulting in a determination of PVTBB corner voltage values $VDD_{c,PVTBB}$ of the supply voltage, wherein each $VDD_{c,PVTBB}$ equals $VDD_{nom}+/−(x+y)$ %.

6. The method for characterization of a standard cell with adaptive body biasing according to claim 5, wherein a performance value of F of the set of performance values F in the PVTBB corners is determined by interpolation based on the generated data-set for the operating range of the performance value F and different VNW and VPW values, whereas the results are provided in the library file.

7. The method for characterization of a standard cell with adaptive body biasing according to claim 1, wherein the adaptive body biasing of a PVT corner is performed before the characterization of the cell.

8. The method for characterization of a standard cell with adaptive body biasing according to claim 1, wherein a circuit characteristic of the standard cell is a delay time.

9. The method for characterization of a standard cell with adaptive body biasing according to claim 1, wherein a circuit characteristic of the standard cell is a leakage current consumption.

10. The method for characterization of a standard cell with adaptive body biasing according to claim 1, wherein the method is used for the characterization of analogue or mixed-signaled circuit blocks.

11. The method for characterization of a standard cell with adaptive body biasing according to claim 10, wherein the circuit block is an oscillator circuit or a driver circuit.

12. The method for characterization of a standard cell with adaptive body biasing according to claim 1, wherein the method further comprises considering dynamic derivations in the bias voltages VNW and VPW by adding a VPW dynamic derivation pessimism of plus or minus (i.e., +/−) ΔVPW to the VPW or by adding a VNW dynamic derivation pessimism of +/−ΔVNW to the VNW related to said reference performance F0 of the standard cell, wherein VNW+/−ΔVNW equals $VNW_c$ and wherein VPW+/−ΔVPW equals $VPW_c$, for each PVT corner and is used for representing a charge pump ripple.

13. The method for characterization of a standard cell with adaptive body biasing according to claim 1, wherein a pessimism of plus or minus $ΔVPW_m$ (i.e., $+/−ΔVPW_m$) is added to the adaptive body bias voltage VPW or a pessimism of plus or minus $ΔVNW_m$ (i.e., $+/−ΔVNW_m$) is added to the adapted body bias voltage VNW, wherein $ΔVPW_m$ and $ΔVPW_m$ are used for representing a mismatch effect in the hardware performance monitor circuit.

14. The method for characterization of a standard cell with adaptive body biasing according to claim 1, wherein the method further comprises considering dynamic deviations in the supply voltage V of the standard cell by applying a pessimism of plus or minus y percent (i.e., +/−y %) to the nominal voltage value $VDD_{nom}$ of the supply voltage V, resulting in a determination of PVTBB corner voltage values $VDD_{c,PVTBB}$ of the supply voltage, wherein each $VDD_{c,PVTBB}$ equals $VDD_{nom}+/−(x+y)$ %.

15. The method for characterization of a standard cell with adaptive body biasing according to claim 1, wherein a performance value of F in the set of performance values of F in the PVTBB corners is determined by interpolation based on the generated data-set for the operating range of the performance value F and different VNW and VPW values, whereas the results are provided in the library file.

* * * * *